Oct. 14, 1930.  B. A. CRUMLEY  1,778,587
COTTON GATHERING MACHINE
Filed April 19, 1929  3 Sheets-Sheet 3
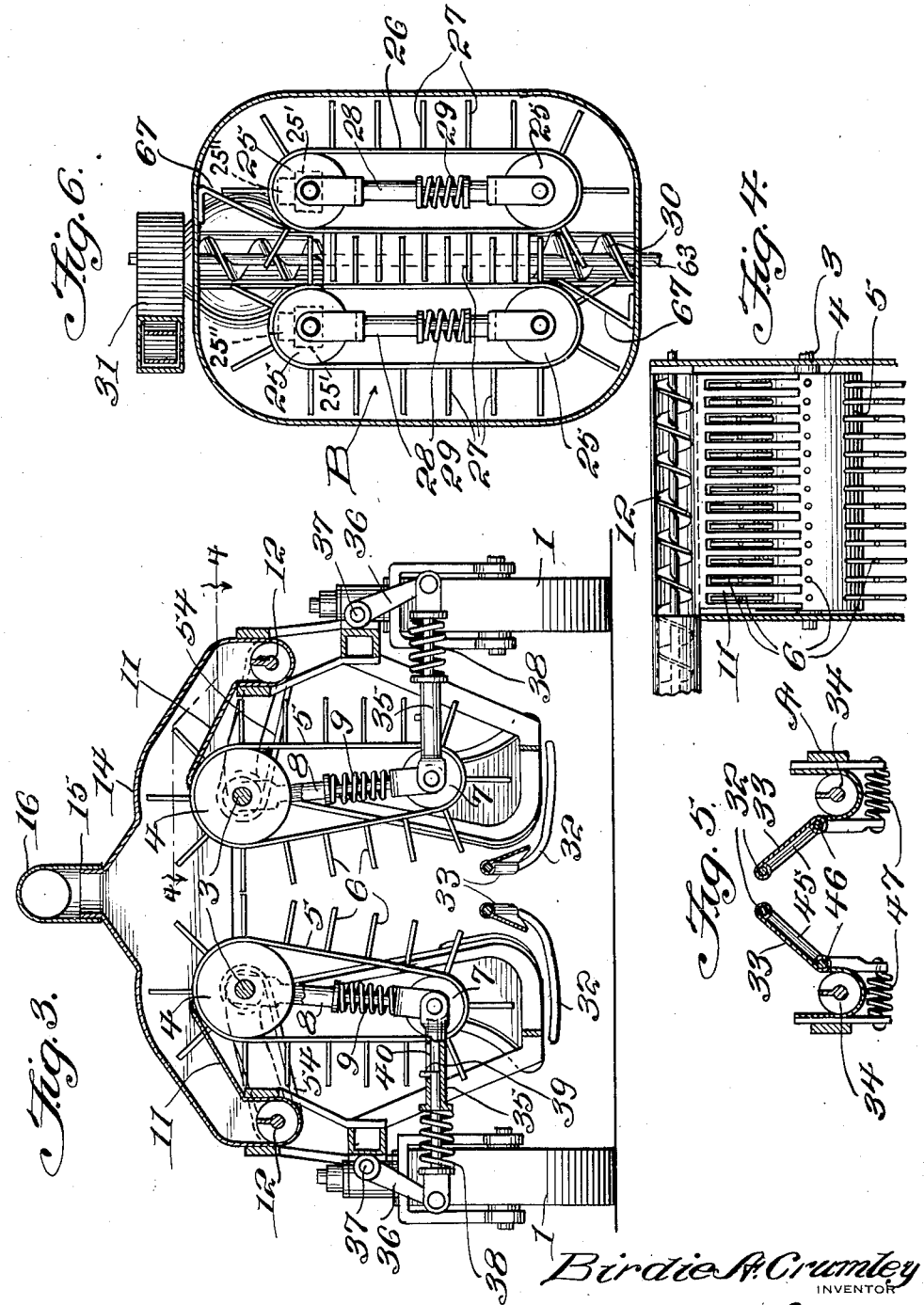
Birdie A. Crumley
INVENTOR
BY Victor J. Evans
ATTORNEY
WITNESS: J.T.L. Wright Patented Oct. 14, 1930

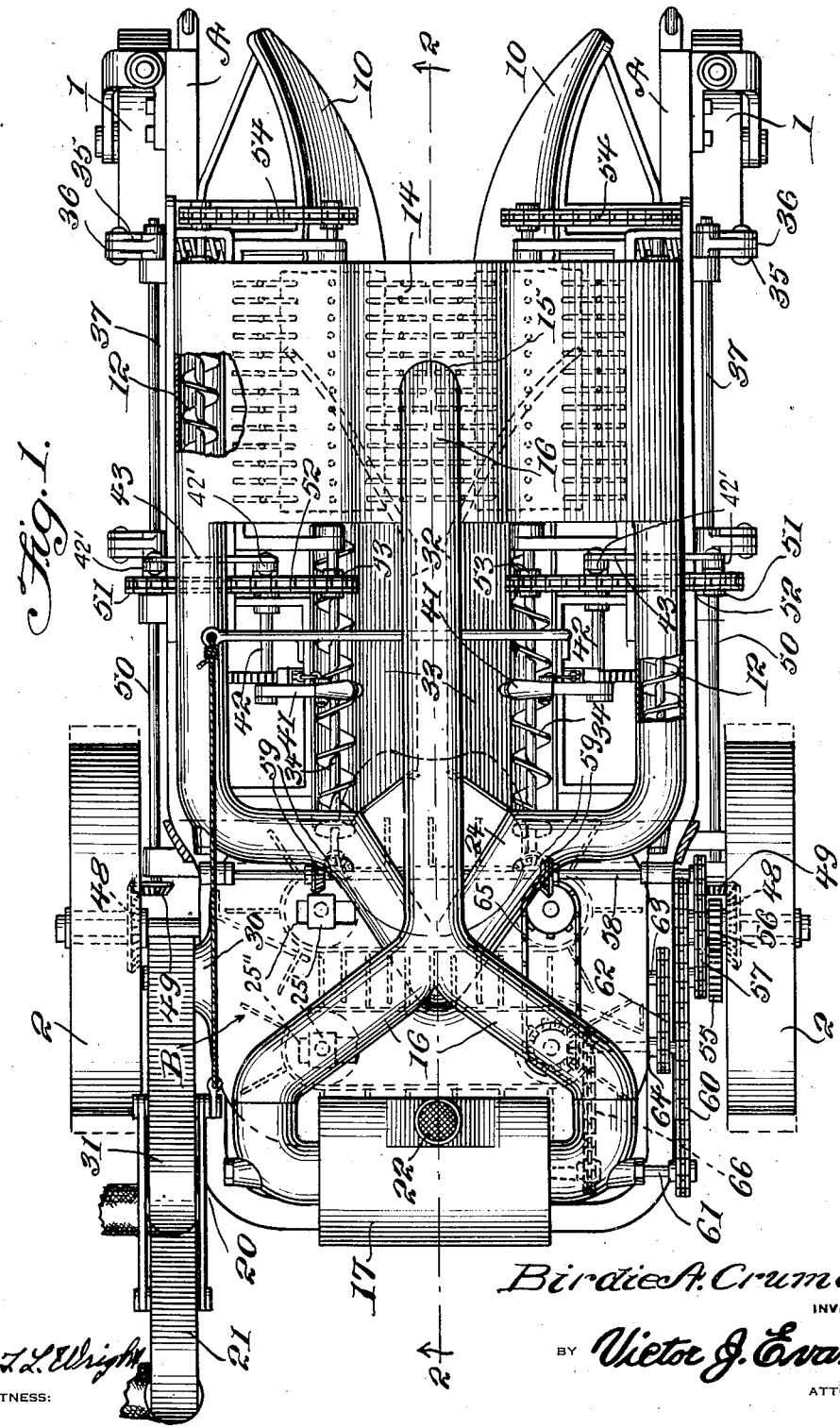

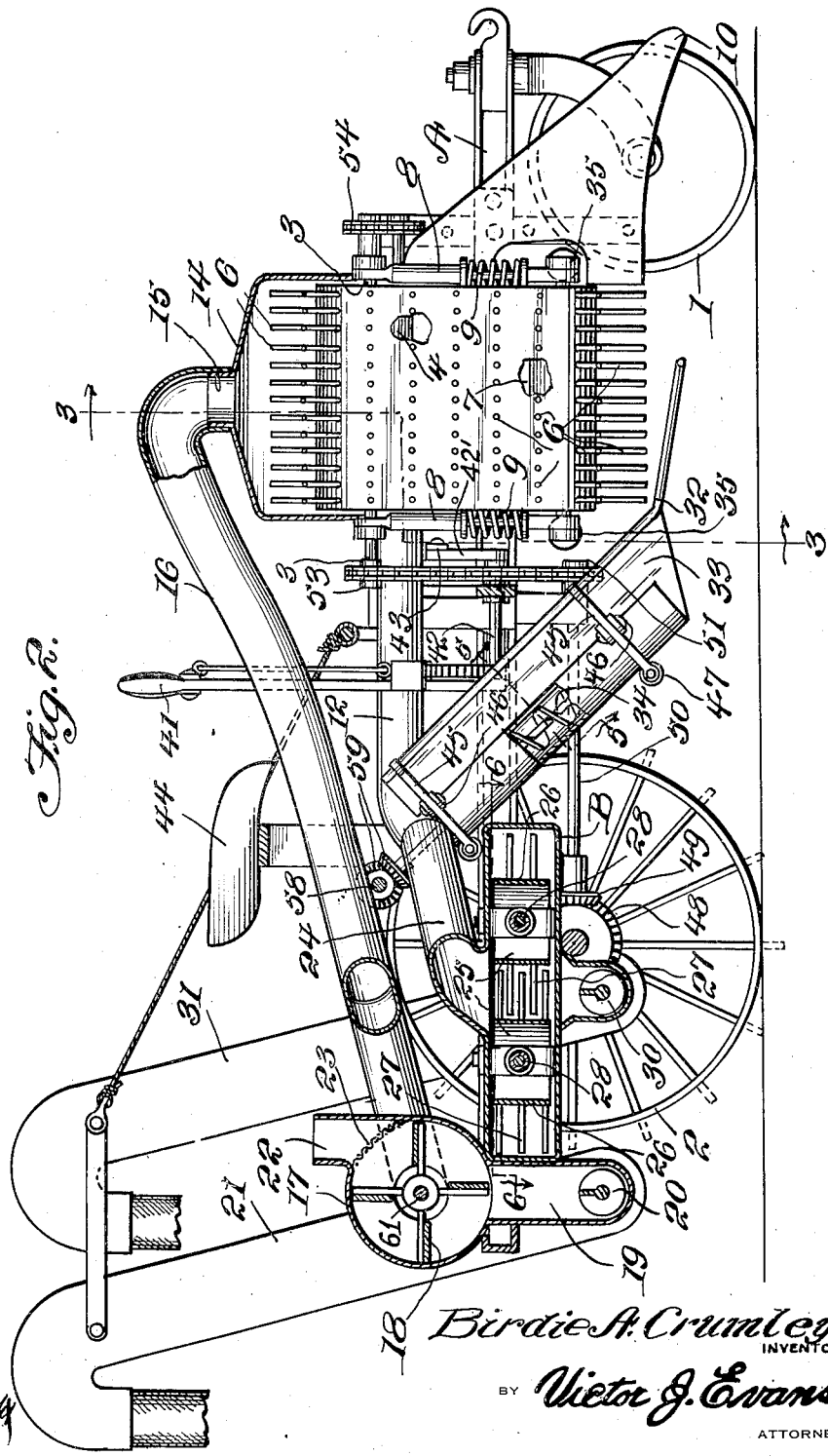

1,778,587

UNITED STATES PATENT OFFICE

BIRDIE A. CRUMLEY, OF WILSON, TEXAS

COTTON-GATHERING MACHINE

Application filed April 19, 1929. Serial No. 356,460.

This invention relates to a cotton gathering machine, the general object of the invention being to provide means for gathering cotton, separating the best grade of cotton from the other cotton and delivering the lower grade of cotton, with the bolls, to a breaker, and then delivering the two grades of cotton by elevators to separate compartments in a wagon or the like.

Another object of the invention is to provide means whereby the gathering means can be adjusted toward and away from each other and to provide resilient means for permitting the gathering means to separate under pressure and also to provide means for gathering the cotton which passes the first set of gathering means.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view, with parts broken away, and parts in section.

Figure 2 is a section on line 2—2 of Figure 1.

Figure 3 is a section on line 3—3 of Figure 2.

Figure 4 is a section on line 4—4 of Figure 3.

Figure 5 is a section on line 5—5 of Figure 2.

Figure 6 is a section on line 6—6 of Figure 2.

In these views, A indicates a frame which is supported at its front end by the pair of caster wheels 1 and at its rear end by the pair of ground wheels 2. A pair of longitudinally arranged parallel shafts 3 is journaled in the upper part of the frame and carry the rollers 4 for the endless belts 5 to which are attached the pins or picker fingers 6. A small roller 7 is supported from each shaft 3 by the telescopic members 8 which are pressed apart by the springs 9 so that each belt, which passes over each roller 7, is kept taut by the springs 9. These parts are so arranged that the fingers on the adjacent reaches of the two belts form an inverted V shaped space for receiving the cotton plants so that as the fingers pass upwardly with the belts, they will pick the cotton from the plants. The plants are guided into the space by the curved guiding members 10 at the front of the machine.

Slotted stripper plates 11 are supported by the frame and each plate slopes downwardly and outwardly from the upper portion of each roller 4, so that the fingers will pass through the slots in the plate and thus the cotton will be stripped from the fingers and pass down the plate into a conveyor 12, one of which is supported at each side of the frame.

A casing 14 is supported at the top of the frame at the front thereof and covers the upper rollers, the stripper plates and the conveyors, and the central part of this casing is formed with an outlet 15 to which is connected a conduit 16 having a forked rear end, the two prongs of which are connected to the inlets at the ends of a fan casing 17 supported at the rear of the frame, so that when the fan 18 in the casing is rotating, it will create a suction in the casing 14, which acts to draw the best grade of cotton from the fingers through the conduit into the fan casing and the cotton will drop into a chute 19 depending from the casing and be conveyed by a conveyor 20 to an elevator 21 which is adapted to deposit the cotton into a compartment of a wagon or the like. Some of the air in the fan casing will be discharged through the exhaust 22, the lower end of which is covered by a screen 23 which prevents cotton from passing through the exhaust. Any cotton collecting on this screen will be removed by the blades of the fan and carried to the chute 19. The conveyors 12 deposit the cotton and the bolls into the chute 24, from which the material will pass into the breaker device B. This device comprises two pairs of rollers 25 over each pair of which passes an endless belt 26 which is provided with the fingers 27, the belts traveling in opposite directions, as shown by the arrows in Figure 6, so that the fingers will move in opposite directions and thereby break up the bolls passing between them, as it will be seen that the chute 24 delivers the material onto the fingers carried by the adjacent reaches of the two belts. These belts are kept taut by the telescopic members 28 and the springs 29 which are similar to the belt tightening means before described. The material, after being broken up, passes into a conveyor 30 which deposits the material into an elevator 31 which may deposit the material into another compartment of the wagon. After the plants leave the picking means, they will be engaged by the obliquely arranged stripper bars 32 which are supported on the frame in rear of the stripper fingers so that as the obliquely arranged bars pass the plants, they will strip therefrom any cotton that remains on the plants and this cotton will roll down the aprons 33 which are connected with the bars, into the conveyors 34, which convey the cotton to the chute 24, so that the cotton will be stripped from the plants by these bars 32 and conveyed to the breaker device B.

The trunnions of each roller 7 are connected by the telescopic members 35 with the cranks 36 on a shaft 37 journaled in the frame, and each telescopic member is provided with a spring 38 which tends to force the sections of each member apart, this movement being limited by a projection 39 on one section engaging a slot 40 in the other section. Thus if the size of the plant should be so great as to prevent it from readily passing into the space between the stripper means, the springs would give so that the size of the space would be increased. This arrangement also prevents damage to the parts if the machine should straddle a stump or other object. The space between the picker means can be adjusted by rocking the shafts 37 through means of the hand levers 41, each of which is connected with a shaft by the shaft 42 and the links 43. The links are connected to the crank arms 42' which are carried by the shafts 37 and 42. These levers are arranged adjacent the seat 44 so that the operator can quickly and easily increase or decrease the space between the picker means as he watches the plants in the row which the machine is traversing.

The stripper bars 32 are also yieldingly supported so that they can move away from each other, as these bars and aprons are provided with the supporting members 45 which are pivotally supported intermediate their ends, as shown at 46, with the springs 47 connecting the lower ends of the members with a part of the frame so that if a bush or other object of considerable size starts to pass between the stripper bars, the springs will yield and permit the bars to move away from each other so that the plant or object can pass between them.

Each ground wheel 2 carries a gear 48 with which a gear 49 on a shaft 50 meshes, the shaft carrying a sprocket 51 at its front end over which passes a chain or belt 52 which also passes over a sprocket 53 on each shaft 3 of the roller 4. Thus the picking means at the front of the machine is actuated by the ground wheels.

Each conveyor 12 is actuated from the shaft 3 through the chain and sprockets shown generally at 54. A gear 55, supported by a stub shaft 63 meshes with a gear 56 which is connected with the gear 48 and a chain 57 passes over a sprocket on said stub shaft and over a sprocket on a shaft 58 which is connected by the gears 59 with the shafts of the conveyors 34 and a chain 60 passes over a sprocket on the rear axle and over a sprocket on a shaft 61 to which the fan 18 is connected. A chain 62 passes over a sprocket on the stub shaft 63 and over a sprocket on a shaft 64, this shaft being geared with the shaft of one of the rollers 25 and a roller 25 of the other pair is driven from the first roller 25 through means of the chain 65.

A chain 66 passes over a sprocket on the shaft 64 and over a sprocket on the shaft of the conveyor 20. The shaft 63 is connected with the conveyor 30 of the breaker device. Thus it will be seen that all the movable parts of the apparatus are actuated from the ground wheels and it will, of course, be understood that one roller 25 of each set must be provided with movable bearing members 25' movably arranged in slots 25'' in a part of the frame so that the spring 25 can keep the belt 26 taut. This breaker member is also provided with the slotted stripper plates 67, one for each belt, for stripping the material from the fingers and depositing it into the conveyor 30.

From the foregoing it will be seen that I have provided means for gathering the cotton and the boll cotton and immature cotton and separating the best grade of cotton from the poorer grade, with means for elevating the two grades separately into a wagon or the like and means for breaking the boll cotton before it enters the elevator.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A cotton gathering machine comprising a wheel supported frame, two pairs of rollers supported in the front part of the frame, with one roller of each pair above the other, an endless belt passing over the rollers of each pair, picker fingers carried by the belts, a casing over the upper rollers, a fan supported on the rear part of the frame, a conduit for connecting the fan casing with the first mentioned casing whereby some of the cotton on the picker fingers will be drawn into the fan casing, a depending chute connected with the fan casing into which the cotton will pass, an elevator, means for conveying the cotton into said elevator, a screened outlet for the air in the fan casing, slotted stripper plates arranged in the casing adjacent the upper rollers, the fingers passing through the slots thereof, a pair of conveyors for receiving the material from the stripper plates, a breaker device carried by the frame, means for delivering the material from the conveyors into said breaker device, an elevator and means for conveying the material passing through the breaker device into said second elevator.

2. A cotton gathering machine comprising a wheel supported frame, two pairs of rollers supported in the front part of the frame, with one roller of each pair above the other, an endless belt passing over the rollers of each pair, picker fingers carried by the belts, a casing over the upper rollers, a fan supported on the rear part of the frame, a conduit for connecting the fan casing with the first mentioned casing whereby some of the cotton on the picker fingers will be drawn into the fan casing, a depending chute connected with the fan casing into which the cotton will pass, an elevator, means for conveying the cotton into said elevator, a screened outlet for the air in the fan casing, slotted stripper plates arranged in the casing adjacent the upper rollers, the fingers passing through the slots thereof, a pair of conveyors for receiving the material from the stripper plates, a breaker device carried by the frame, means for delivering the material from the conveyors into said breaker device, an elevator means for conveying the material passing through the breaker device into said second elevator and means for actuating the parts from the ground wheels.

3. A cotton gathering machine comprising a wheel supported frame, two pairs of rollers supported in the front part of the frame, with one roller of each pair above the other, an endless belt passing over the rollers of each pair, picker fingers carried by the belts, a casing over the upper rollers, a fan supported on the rear part of the frame, a conduit for connecting the fan casing with the first mentioned casing whereby some of the cotton on the picker fingers will be drawn into the fan casing, a depending chute connected with the fan casing into which the cotton will pass, an elevator, means for conveying the cotton into said elevator, a screened outlet for the air in the fan casing, slotted stripper plates arranged in the casing adjacent the upper rollers, the fingers passing through the slots thereof, a pair of conveyors for receiving the material from the stripper plates, a breaker device carried by the frame, means for delivering the material from the conveyors into said breaker device, an elevator, means for conveying the material passing through the breaker device into said second elevator, diagonally arranged stripper bars on the frame in rear of the picking means for removing any cotton that remains on the plants after the same have passed through the picking means and means for delivering the material from the stripper bars into the breaker device.

4. A cotton gathering machine comprising a wheel supported frame, two pairs of rollers supported in the front part of the frame with one roller of each pair above the other, an endless belt passing over the rollers of each pair, picker fingers carried by the belts, a casing over the upper rollers, a fan supported on the rear part of the frame, a conduit for connecting the fan casing with the first mentioned casing whereby some of the cotton on the picker fingers will be drawn into the fan casing, a depending chute connected with the fan casing into which the cotton will pass, an elevator, means for conveying the cotton into said elevator, a screened outlet for the air in the fan casing, slotted stripper plates arranged in the casing adjacent the upper rollers, the fingers passing through the slots thereof, a pair of conveyors for receiving the material from the stripper plates, a breaker device carried by the frame, means for delivering the material from the conveyors into said breaker device, an elevator, means for conveying the material passing through the breaker device into said second elevator, diagonally arranged stripper bars on the frame in rear of the picking means for removing any cotton that remains on the plants after the same have passed through the picking means, means for delivering the material from the stripper bars into the breaker device, means for yieldingly supporting the lower rollers of the picking means whereby the two sets of picking means can move apart under pressure and means for yielding supporting the stripper bars whereby said bars can move apart under pressure.

5. A cotton gathering machine comprising a wheel supported frame, two pairs of rollers supported in the front part of the frame with one roller of each pair above the other, an endless belt passing over the rollers of each pair, picker fingers carried by the belts, a casing over the upper rollers, a fan supported on the rear part of the frame, a conduit connecting the fan casing with the first mentioned casing whereby some of the cotton on the picker fingers will be drawn into the fan casing, a depending chute connected with the fan casing into which the cotton will pass, an elevator, means for conveying the cotton into said elevator, a screened outlet for the air in the fan casing, slotted stripper plates arranged in the casing adjacent the upper rollers, the fingers passing through the slots thereof, a pair of conveyors for receiving the material from the stripper plates, a breaker device carried by the frame, means for delivering the material from the conveyors into said breaker device, an elevator, means for conveying the material passing through the breaker device into said second elevator, diagonally arranged stripper bars on the frame in rear of the picking means for removing any cotton that remains on the plants after the same have passed through the picking means, means for delivering the material from the stripper bars into the breaker device, means for yieldingly supporting the lower rollers of the picking means whereby the two sets of picking means can move apart under pressure, means for yieldingly supporting the stripper bars whereby said bars can move apart under pressure and manually operated means for adjusting the lower rollers of the picker means toward and away from each other.

6. A cotton gathering machine comprising a wheel supported frame, two pairs of rollers supported in the front part of the frame, with one roller of each pair above the other, an endless belt passing over the rollers of each pair, picker fingers carried by the belts, a casing over the upper rollers, a fan supported on the rear part of the frame, a conduit for connecting the fan casing with the first mentioned casing whereby some of the cotton on the picker fingers will be drawn into the fan casing, a depending chute connected with the fan casing into which the cotton will pass, an elevator, means for conveying the cotton into said elevator, a screened outlet for the air in the fan casing, slotted stripper plates arranged in the casing adjacent the upper rollers, the fingers passing through the slots thereof, a pair of conveyors for receiving the material from the stripper plates, a breaker device carried by the frame, means for delivering the material from the conveyors into said breaker device, an elevator, means for conveying the material passing through the breaker device into said second elevator, said breaker device comprising two pairs of rollers, a belt passing over the rollers of each pair, fingers on each belt and means for causing the belts to travel in opposite directions.

In testimony whereof I affix my signature.

BIRDIE A. CRUMLEY.